Patented Oct. 9, 1951

2,570,830

UNITED STATES PATENT OFFICE 2,570,830

METHOD OF SIZING TEXTILE WARP YARNS

Justin J. McCarthy, Arlington, and William J. Harrison, Reading, Mass., assignors to Monsanto Chemical Company, St. Louis, Mo., a corporation of Delaware No Drawing. Application August 2, 1945, Serial No. 608,616

3 Claims. (Cl. 117—139.5)

This invention relates to an improved textile size, and to methods of sizing warp yarns therewith. More particularly the invention relates to improved starch sizing compositions of the type used in slashing operations.

It has been common practice to apply starch size solutions to the warp yarn prior to weaving for the purpose of increasing the strength of the yarn, reducing shedding during passage through the loom or for other reasons. However, ordinary starch sizes, on drying, have the disadvantage of dusting to a considerable extent, both in the slasher and in the loom. Moreover, they do not reduce shedding as much as might be desired.

It is accordingly an important object of the invention to provide starch size slashing formulations which result in a markedly decreased amount of dusting and shedding and at the same time produce yarns of enhanced strength and resistance to breakage in the loom.

Another important object of the invention is to provide a sizing or slashing composition which possesses greater adherence to the yarn and produces smoother warps than can be obtained with ordinary starch sizing compositions.

The most important feature of the invention is the production of warp yarns capable of being woven with considerably less "ends down" and hence with considerably fewer loom stoppages. This, and the other advantages of the invention, are accomplished by using along with the usual starch size solutions small amounts of certain sols or colloidal solutions of silica which are capable of supplying silica in the form of submicroscopic particles. Starch sizes as commonly employed contain varying amounts of starch and water, and are prepared by boiling a slurry of the starch and water to produce a colloidal solution. Small amounts of tallow or other softeners or lubricants are also frequently present in the size mix.

Colloidal solutions of silica suitable for the purposes of this invention may be made in a variety of ways, but are preferably made by reacting an acid, such as a mineral acid or any other acid capable of forming salts by reaction with silicates, with a water-soluble silicate in the manner customarily employed to form silica gel, washing the resulting gel with water to remove the electrolytes formed during the reaction, covering the gel with a weak aqueous solution of a substance capable of forming hydroxyl ions and, after removing the gel from the solution, heating the gel, while avoiding evaporation of water, until substantially all of the gel is converted to a sol.

A specific example of the above method of making colloidal solutions or sols of silica is as follows:

Seventy-three pounds of 66° Bé. $H_2SO_4$ were diluted with 358 pounds of water and charged to a mixing tank. Four hundred and seventy-two pounds of a sodium silicate solution analyzing 8.9% $Na_2O$ and 29% $SiO_2$ were diluted with three hundred and seventy-seven pounds of water and added with stirring to the acid solution. The mixture set to a gel a few minutes after the mixing was completed. After 16 hours aging the syneresis liquor was siphoned off and the gel crushed to one inch lumps. These lumps were washed with a continuous flow of water for 16 hours. The washed gel was then covered with seven hundred and fifty pounds of water containing 0.9 pound of NaOH. After standing 6 hours the excess solution was drained off and a portion of the gel was charged to an autoclave. The gel was heated for three hours, using steam at two hundred and fifteen pounds per square inch absolute pressure in the jacket of the autoclave. The contents of the autoclave were then blown out and the small amount of residual undispersed gel was removed by filtration. The solution so produced contained about 12.5% $SiO_2$.

A still more complete description of the manufacture of the above type of sol may be obtained in the patent to John F. White, No. 2,375,738.

Solutions prepared in the above manner are preferred, since they are stable for an indefinite period of time. Moreover, the silica contained therein has a larger particle size than the silica contained in other types of sols, and since they are usually prepared in a neutral or slightly alkaline state, they are admirably adapted for the purposes of this invention. It is possible, however, to prepare the colloidal solutions as described above, then to acidify them and use them in a slightly acid condition, when desired. Other types of colloidal solutions or sols of silica may also be used. For example, it is possible to use a sol prepared by reacting a water-soluble silicate with acid and subjecting the acidified silicate to treatment with alcohol and/or to cooling to remove the electrolyte, as described in the U. S. patent to Morris D. Marshall, No. 2,285,449, and the U. S. patent to John F. White, No. 2,285,477. It is also possible to use sols prepared by treatment of an alkali silicate with ion-exchange material, as described in the U. S. patent to Paul G. Bird, No. 2,244,325.

The concentration of the colloidal solutions or sols used in accordance with this invention may be varied over a wide range. In general, it is possible to use sols having silica concentrations varying between 0.1 and 30%. Regardless of the concentration used, however, it is important to add to the starch solution sufficient of the sol to provide a silica content varying from about 0.1 to 1% of the finished sizing solution, although somewhat larger amounts of silica may be incorporated, if desired.

Several different methods may be used to prepare and apply the starch sizes to the yarn. For example, a slurry of starch and water is first added to a size kettle, after which the silica sol and tallow or other softener (if any) are added. The resulting slurry is then mixed by means of suitable paddles or the like, and heated to the boiling point, which usually requires about 15 or 20 minutes. The mixture is then boiled for about one to two and a half hours, at which time it is ready to be added to the size box for the treatment of the warp yarns. The treated yarns are customarily dried over dry cans or the like, and passed through split bars to avoid adherence of the individual yarns to each other, before being wound on the loom beam.

As a variation of the above method, the tallow or other softener may be added to the size kettle immediately after the starch size is brought to a boil, the silica solution being added near the end of the boil. Still another variation consists in first applying the colloidal silica solution to the warps, after which they are dried. They are then passed through a starch size solution and again dried. The silica solution is preferably at the boil, but may be applied at room temperature or any intermediate temperature. By using two baths in the manner just described, it is possible to obtain yarns of increased strength and elasticity. Moreover, this method results in lower slashing costs and increased loom efficiencies as compared with the single bath treatment.

It is sometimes desirable to add a humectant, such as glycerine, ethyl ammonium phosphate or other alkyl phosphates, to the bath, either instead of or in addition to the softener, as baths containing a suitable humectant yield a better sizing film and permit weaving at lower humidities with less ends down than baths not containing a humectant. The humectant should preferably be added near the end of the boil.

The following are examples of baths or mixes both containing and not containing a silica sol.

Bath 1

Corn starch _____pounds__ 140
Tallow _____do____ 11
Water _____gallons__ 138

The above bath is preferably prepared by first mixing the starch and water, bringing the mixture to a boil, then adding the tallow, and boiling for about one hour. The final solution had a volume of about 194 gallons.

Bath 2

Corn starch _____pounds__ 140
Tallow _____do____ 11
15% silica sol _____gallons__ 6
Water _____do____ 138

This bath was prepared in the same manner as Bath 1, with the exception that the silica sol was added and stirred in near the end of the boil. The finished bath had a volume of about 200 gallons.

Bath 3

Potato starch _____pounds__ 140
Glycerine _____gallons__ 1
15% silica sol _____do____ 6
Water _____do____ 138

This bath was prepared by first mixing the starch and water, bringing the mixture to a boil, and continuing the boiling for about an hour and a half. Near the end of the boil, the glycerine and silica sol were added. Upon completion of the mixing and boiling, the bath contained about 200 gallons of solution, which was then ready for application to the yarn.

By way of comparison of the above baths as sizing compositions, cotton yarns were treated with the above baths in the slasher, and then woven. During the tests a record was made of the number of clean breaks (ends down) requiring stoppage of the loom with the following results:

Bath 1

|  | First Day | Second Day | Third Day | Fourth Day | Average Number of Stops Per Loom Hour |
|---|---|---|---|---|---|
| Length of test (in loom hours) | 56 | 56 | 56 | 56 | ---------- |
| Number of stops due to clean breaks | 6 | 3 | 9 | 10 | 0.125 |

Bath 2

|  | First Day | Second Day | Third Day | Fourth Day | Average Number of Stops Per Loom Hour |
|---|---|---|---|---|---|
| Length of test (in loom hours) | 20 | 20 | 20 | 20 | ---------- |
| Number of stops due to clean breaks | 1 | 1 | 1 | 0 | 0.0375 |

Bath 3

|  | First Day | Second Day | Third Day | Fourth Day | Average Number of Stops Per Loom Hour |
|---|---|---|---|---|---|
| Length of test (in loom hours) | 40 | 40 | 40 | 40 | ---------- |
| Number of stops due to clean breaks | 3 | 0 | 0 | 0 | 0.018 |

Upon examining the above tabulations, it can be seen that Bath 2 produced a 70% reduction in the average number of stops per loom hour as compared with Bath 1, while Bath 3 produced an 85.6% reduction as compared with Bath 1. Moreover, during the tests much less dusting and shedding was observed in the slashers and looms, where the yarn was sized with Baths 2 and 3 than in the case of the yarn sized with Bath 1. The yarns treated with starch baths containing silica sol were also smoother than those treated with the usual starch size, and it was noted that the size tended to adhere better when the sol was added.

Where reference is made in the examples to 15% silica sol, it is to be understood that this refers to an aqueous colloidal solution containing 15% silica colloidally dissolved or dispersed therein.

The size compositions described herein may be applied with equally good results to a wide variety of textile yarns, including those of cotton, linen, flax, hemp, jute, ramie, wool, silk, the various rayons such as viscose, acetate and cuprammonium, the various synthetic textile materials, such as nylon, Vinyon, Aralac and glass, and mixtures or blends of the above materials.

What we claim is:

1. The method of sizing textile warp yarns which comprises treating said yarns with a solution consisting of 140 pounds of corn starch, 11 pounds of tallow, 6 gallons of a 15% stable silica sol which consists of an aqueous colloidal solution containing 15% of silica colloidally dispersed therein and 138 gallons of water, and then drying the treated yarns.

2. The method of sizing textile warp yarns which comprises treating said yarns with a solution consisting of 140 pounds of potato starch, 1 gallon of glycerine, 6 gallons of a 15% stable silica sol which consists of an aqueous colloidal solution containing 15% of silica colloidally dispersed therein and 138 gallons of water, and then drying the treated yarns.

3. The method of sizing textile warp yarns which comprises treating said yarns with an aqueous starch size solution to which there has been added a stable colloidal solution of silica consisting of silica and water, said silica solution being added to the starch solution in an amount sufficient to provide a silica content varying from 0.1 to 1% of the total sizing solution, and then drying the treated yarn.

JUSTIN J. McCARTHY.
WILLIAM J. HARRISON.

REFERENCES CITED

The following references are of record in the file of this patent:

UNITED STATES PATENTS

| Number | Name | Date |
|---|---|---|
| 351,890 | Waite | Nov. 2, 1886 |
| 414,351 | Wattles | Nov. 5, 1889 |
| 1,147,996 | Wrede | July 27, 1915 |
| 1,587,094 | Walen | June 1, 1926 |
| 1,823,721 | Bennett | Aug. 15, 1931 |
| 2,024,123 | Baker | Dec. 10, 1935 |
| 2,103,205 | Myers | Dec. 21, 1937 |
| 2,120,569 | Oliver | June 14, 1938 |
| 2,213,643 | Alton | Sept. 3, 1940 |
| 2,375,738 | White | May 8, 1945 |
| 2,377,841 | Marshall | June 5, 1945 |
| 2,381,587 | Griffin | Aug. 7, 1945 |
| 2,383,653 | Kirk | Aug. 28, 1945 |
| 2,399,981 | Britt | May 7, 1946 |
| 2,408,656 | Kirk | Oct. 1, 1946 |

FOREIGN PATENTS

| Number | Country | Date |
|---|---|---|
| 2,978 | Great Britain | 1862 |
| 1,402 | Great Britain | 1868 |

OTHER REFERENCES

Gen'l Fire Extinguishing Co., How to Secure Strength from Starches, 1917, pages 1, 2 and 3.